(12) United States Patent
Parent et al.

(10) Patent No.: US 7,763,176 B2
(45) Date of Patent: Jul. 27, 2010

(54) PROCESS FOR THE TREATMENT OF PIG MANURE AND THE USE THEREOF

(76) Inventors: Gaetan Parent, 1142 St-Louis, St-Jean-Chrysostône, Québec (CA) G6Z 2L2; Régis Simard, Québec (CA); Lucie Valée, legal representative, 1081, Jean Dumetz, Sainte-Foy, Québec (CA) G1W 4K6

( * ) Notice: Subject to any disclaimer, the term of this patent is extended or adjusted under 35 U.S.C. 154(b) by 1179 days.

(21) Appl. No.: 10/536,896

(22) PCT Filed: Nov. 28, 2003

(86) PCT No.: PCT/CA03/01863

§ 371 (c)(1),
(2), (4) Date: Jan. 20, 2006

(87) PCT Pub. No.: WO2004/050584

PCT Pub. Date: Jun. 17, 2004

(65) Prior Publication Data

US 2006/0144107 A1    Jul. 6, 2006

Related U.S. Application Data

(60) Provisional application No. 60/429,544, filed on Nov. 29, 2002.

(51) Int. Cl.
   *B01D 21/00* (2006.01)
(52) U.S. Cl. .................. 210/702; 210/738; 210/767
(58) Field of Classification Search .............. 71/11–27; 210/738, 702, 767
   See application file for complete search history.

(56) References Cited

U.S. PATENT DOCUMENTS

| 5,296,147 A |   | 3/1994 | Koster et al. |
| 5,993,503 A | * | 11/1999 | Kruidhof ..................... 71/21 |
| 6,409,788 B1 |   | 6/2002 | Sower |
| 6,923,917 B1 | * | 8/2005 | Hughes ..................... 210/702 |

FOREIGN PATENT DOCUMENTS

| EP | 0 530 826 A | 3/1993 |
| EP | 0 701 983 A | 3/1996 |

OTHER PUBLICATIONS

Kabata-Pendias, A., et al., "Trace Elements in Soils and Plants," p. 37 (2001).

(Continued)

*Primary Examiner*—Wayne Langel
(74) *Attorney, Agent, or Firm*—Birch, Stewart, Kolasch & Birch, LLP (57) ABSTRACT

The invention relates generally to a process to treat domestic animal manure, such as pigs and swine, so that the treated manure can be environmentally acceptable. More particularly, the present invention relates to a process of de-phosphatation of manure comprising the steps of i) adding by-products of electrolysis and foundry (BPEF) to liquid manure, ii) stirring the manure-containing BPEF iii) letting the manure-containing BPEF that was so stirred stand for a time sufficient for the manure to separate into a solid fraction and a liquid fraction, the solid fraction depositing in the manure pit; and iv) separating the liquid and solid fractions. The liquid fraction contains less than 50% of total phosphorus initially contained in the manure, the phosphorus being found in the solid fraction.

8 Claims, 7 Drawing Sheets

OTHER PUBLICATIONS

Levlin, E., et al., "Phosphorus Recovery From Sewage Sludge—Ideas for Further Studies to Improve Leaching," pp. 61-70.

Moore, P. A., et al., " Reducing Phosphorus Runoff and Improving Poultry Production with Alum," Poultry Science, vol. 78, pp. 692-698 (1999).

Felton, G.K., et al., "Water-Extractable Phosphorus Reduction in Poultry Litter with Calcium-and Iron-Rich Byproduct Amendments," Am. Soc. Agri. Eng., vol. 47, No. 6, pp. 2069-2077 (2004).

Moore, P.A., et al., "Long-Term Effects of Poultry Litter, Alum-Treated Litter, and Ammonium Nitrate on Phosphorus Availability in Soils," J. Environ. Qual., vol. 36, pp. 163-174 (2007).

Sas, L., et al., "Suitability of hydroxyapatite and iron phosphate as P sources for *Lupinus albus* grown in nutrient solution," Plant and Soil, vol. 235, pp. 159-166 (2001).

* cited by examiner

FIG_1A

FIG_1B

FIG_2A

FIG_2B

FIG_3

FIG_4

FIG_7

FIG_8

FIG_9

FIG_10

FIG_11

US 7,763,176 B2

PROCESS FOR THE TREATMENT OF PIG MANURE AND THE USE THEREOF

This application is the national stage of International Application PCT/CA2003/001863, filed Nov. 28, 2003, which claims priority under 35 USC §119(a) of Provisional Application No. 60/429,544, filed Nov. 29, 2002.

TECHNICAL FIELD

The invention relates generally to a process to treat domestic animal manure, such as pigs and swine, so that the treated manure can be environmentally acceptable.

DESCRIPTION OF PRIOR ART

The creation of large farms at the commercial level for raising domestic animals in large numbers such as cows, chickens, pigs and swine, has created an increased environmental concern over the animals' waste products created by such a large domestic production of animals. Typical environmental concerns, which are each related but different in results, include, among others, ground water and stream contamination from runoff at the waste sites and soil contamination, particularly for agricultural purposes, resulting from the large volume of waste. Therefore, animal manure has become a tremendous environmental problem throughout the world. The increasing production of pig and swine waste products presents an important problem for both farming soils and the natural environment, which include streams, water tables and soils.

The marked increase in phosphorus (P) content of many agricultural soils and the increase of the phosphorus concentration in rivers, beyond eutrophication, bring many environmental concerns. Many studies have shown the relation between the concentration of phosphorus in the various layers of soils and the phosphorus content in draining and streaming waters. Accordingly, the introduction of phosphorus into the environment should now be carefully controlled; otherwise there may be a potential degradation of the quality of surface water. These considerations are particularly important in regions where farms overproduce manure with respect to the total need in nitrogen (N) and phosphorus (P) of the various crops on the farms. Accordingly, since there is a surplus of manure, there is not enough land available to correctly dispose of the quantity of manure produced.

This situation is often observed in pig and swine production farms. These types of farms have seen a marked expansion in the last 25 years and now generate an important amount of phosphorus-enriched waste. Generally, pig manure is in a liquid form. The content in phosphorus of such manure should be reduced before such manure could be spread on soils with high phosphorus content to limit the environmental impact of a massive addition of phosphorus to these soils.

Moreover, pig and swine manure contains approximately 95% water and 5% of solid material. This large liquid content renders the use of such manure very difficult outside the farm where such manure is produced due to important transportation costs. It would therefore be advantageous to provide new methods that would reduce the quantity or the solubility of phosphorus from swine and pig manure. The liquid fraction of the manure with a reduced P concentration could be used on the farm whereas the solid fraction enriched in P could be exported to areas deficient in P.

Various solutions have been proposed in the prior art. One of the most popular solutions is the separation of a solid fraction from manure. Among the methods used, the mechanical separation using a press, centrifugation, chemical flocculation and drying are among those currently proposed. The chemical flocculation or precipitation is mainly accomplished by the addition of bivalent or trivalent cations, which, in presence of phosphorus in the liquid fraction, precipitate. This precipitate can thus be recuperated in a solid waste fraction, which deposits at the bottom of the manure pit. The compounds currently used for the chemical precipitation are alum ($Al_2SO_4$), lime ($Ca(OH)_2$), ferrous sulphate ($FeSO_4$) or zirconium chloride ($ZrCl_2$). The separation of the precipitate from the liquid portion may however be difficult. Furthermore, the use of metallic salts (commercial formulation) increases the cost of such treatment. The iron of ferric salts could also be too soluble once added to the soils and therefore contaminate them.

In a different industry, namely in the magnesium industry, there is a different type of problem. The magnesium industry is producing by-products of electrolysis and foundry (BPEF), which represent a waste for that industry. Currently, BPEF are being stocked in containers. There are currently no other methods for disposing of these by-products. However, several methods have been proposed for disposing of these by-products, namely spreading them over land or crushing and spreading them in swamps and seas. The spreading of the BPEF over land has caused serious problems in that the BPEF contains metallic magnesium and can burst into flame when in contact with water and air.

The magnesium that is being contained in BPEF can be found under various forms: approximately 30% is found as MgO, 27% is found as carnalite ($KMgCl_3$), about 14% is found as magnesium chloride ($MgCl_2$), 12% is found as $Mg_3N_2$, 2% is found as $Mg_2C_3$, and about 15% is metallic magnesium. Other compounds are also found in BPEF such as about 30% of sodium chloride (NaCl) and about 20% of calcium oxide (CaO).

It would therefore be advantageous to be provided with a method that would solve the problem of both industries, namely the magnesium industry and the pig and swine farms.

SUMMARY OF THE INVENTION

One aim of the present invention is to provide a method that solves the problem of the magnesium industry and of the pig and swine production farms using the BPEF produced in the magnesium industry for removing a significant portion of the phosphate and phosphorus from the liquid fraction of pig and swine manure, allowing for the spreading of such manure over the agricultural lands rich in phosphorus, without being detrimental to the environment.

In accordance with the present invention, there is therefore provided a process of de-phosphatation of manure, said process comprising the steps of a) adding by-products of electrolysis and foundry (BPEF) to manure;

b) stirring the manure-containing BPEF;

c) letting the manure-containing BPEF that was so stirred stand for a time sufficient for the manure to separate into a fraction with higher dry matter content hereinafter referred to as the "solid fraction" and a liquid fraction, said solid fraction depositing in the manure pit; and d) separating the liquid and solid fractions, wherein said liquid fraction contains less than 50% of total phosphorus initially contained in the manure, said phosphorus being found in the solid fraction.

The BPEF is preferably added gradually to the manure. Stirring is preferably maintained throughout the addition of BPEF. However, one skilled in the art could also add the BPEF and stir only once the addition is completed. Generally, the step of stirring is maintained for a sufficient period of time after the addition of BPEF to ensure proper mixing. Again, one skilled in the art would readily recognize when such mixing is thorough. The time of stirring will vary depending on the volume to be stirred.

In one embodiment of the invention, the manure is left to settle for a period of at least one day and more preferably 2, 3, 4, 5, 6, or 7 days or more after the stirring is finished for allowing deposition of the solid fraction containing phosphorus and solid particles.

The BPEF should be added to the manure "in an amount equivalent to about 0.5 g Mg $L^{-1}$ of manure". This represents only a preferred value which is meant to also include small variations of the amount of BPEF that could be added and that would influence that quantity of magnesium being added. This value is only given to guide the person skilled in the art in reproducing the invention. Of course, one skilled in the art would understand that 0.5 g Mg $L^{-1}$ of manure is a preferred value, but that lower or higher values, such as 1, 1.5, 2.0, 3.0 or 5.0 g Mg $L^{-1}$ of manure would also cause precipitation of the phosphorus in the solid fraction of manure. Accordingly, one skilled in the art would have to know the content in magnesium of the BPEF being used to determine the quantity of BPEF to add to reach a concentration of 0.5 g Mg $L^{-1}$ of manure. Larger or smaller amounts of BPEF could be used in accordance with the present method. However, up to some critical values, the person skilled in the art would readily determine that adding too much BPEF would not create more benefits to the present invention. Of course, this value that is being given as a preferred concentration of 0.5 g Mg $L^{-1}$ of manure will vary depending on the intended use. In some cases, depending on the intended use, a higher concentration of magnesium could be advantageous. One skilled in the art, depending on the end use intended for the liquid fraction separated from the manure, will know what would be the acceptable limit.

The present invention therefore allows improving the content in nutrients of the solid fraction of manure. Moreover, the method of the present invention could also be used concurrently with liquid-solid separation technologies known in the art.

Furthermore, the present invention allows reducing the content in P of the liquid fraction, while still allowing for the disposal of such magnesium-containing industrial by-products that are produced in the magnesium industry, in an environmentally-friendly manner. The solid fraction at the bottom of the manure pit could be used, after dehydration, as slow-release organo-mineral fertilizer.

In accordance with the present invention, there is also provided the use of the solid fraction obtained by the method described herein, as a fertilizer. In one embodiment, the fertilizer can be a slow-release organo-mineral fertilizer.

In the present application, the term "incubation", when referring to the period of time during which the manure supplemented with BPEF is allowed to rest, is used interchangeably with the term "resting". Both terms are intended to mean the period of time after the addition of the BPEF to the manure. Once BPEF is added to the manure, the supplemented manure is then preferably mixed and then left to rest to sediment the solid phase.

DETAILED DESCRIPTION OF THE INVENTION

In accordance with the present invention, there is therefore provided a method that uses the BPEF, which are a problem and waste for the magnesium industry for removing phosphorus and phosphate content from pig and swine manure. The method is simple, direct and more importantly, allows solving the problems of two different industries and creates an original solution that is environmentally acceptable and profitable.

Various laboratory assays have been conducted to determine the flocculation potential of phosphorus (P) of pig manure using industrial by-products that contain magnesium. These assays have clearly shown the potential for reducing phosphate and phosphorus from the liquid fraction of pig manure using these by-products. Further assays that are reported hereinafter have been conducted to determine the agronomic value of such pig manure so treated with magnesium-containing industrial by-products.

Accordingly, in the research that leads to the present invention, three types of by-products that contain magnesium have been tested for their potential for treating manure. These by-products are by-products of electrolysis and foundry (BPEF) and dissolving by-products (DBP) and humidified by-products of electrolysis and foundry (BPEFh).

Figure 1A:
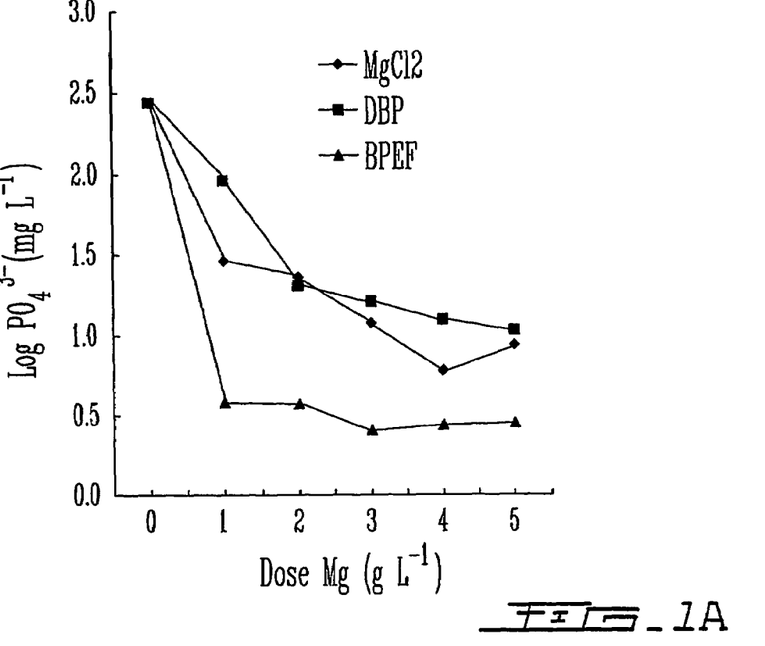
FIGS. 1A and 1B illustrate the effect of Mg on phosphate concentration in a liquid fraction of manure, containing either 4.1% (FIG. 1A) or 1.5% (FIG. 1B) of matter in suspension.
Figure 1B:
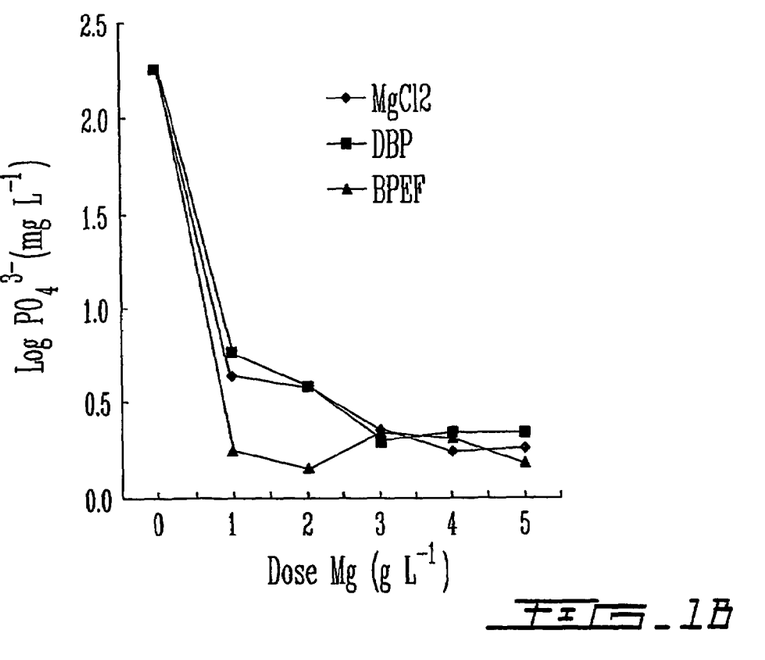

In preliminary tests, increasing doses of Mg from $MgCl_2$ and BPEF (0, 1, 2, 3, 4, and 5 g Mg $L^{-1}$) were added to two different pig manure samples, containing either 1.5 or 4.1% of matter in suspension. The results obtained are illustrated in FIGS. 1A and 1B. From these results reported therein one skilled in the art will appreciate that other concentrations of Mg can be used in accordance with the present invention. However, for the purpose of demonstrating the efficacy of the present invention, a concentration of 3 g of Mg per liter of manure was used in order to establish a common ground for comparison between each assay and test.

Figure 2A:
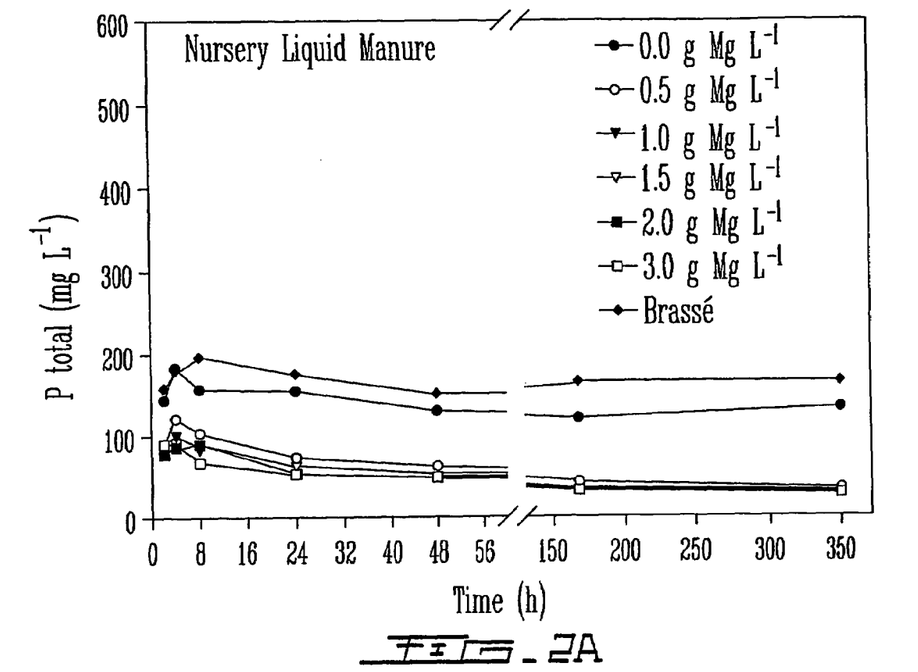
FIGS. 2A and 2B illustrate the effects of incubation time and amount of BPEF added on the total P concentration measured on the liquid portion of manure sampled at two different depth.
Figure 2B:
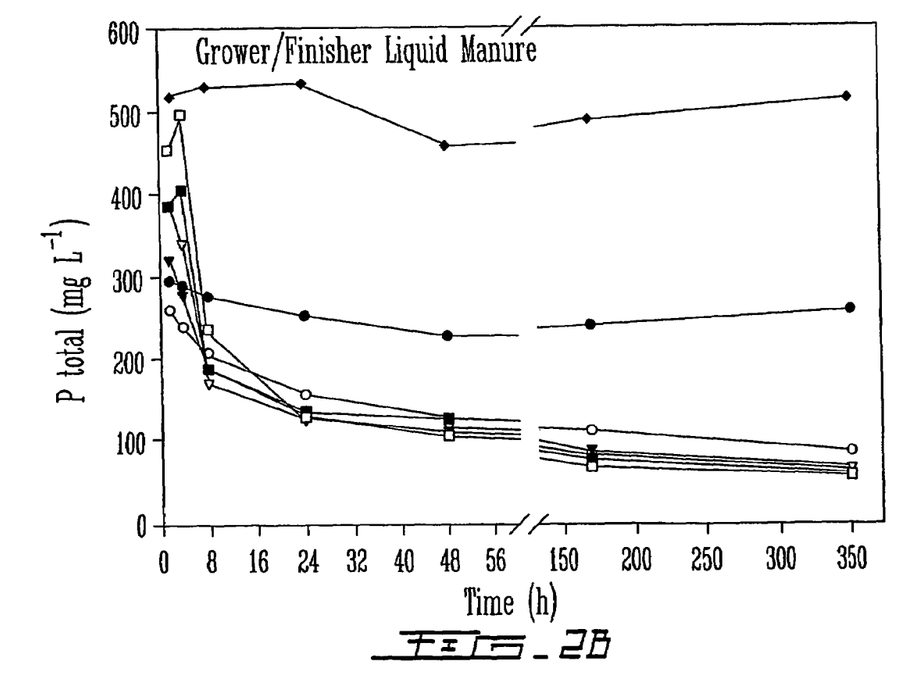

The above preliminary tests were repeated with lower concentration of magnesium and BPEF (0, 0.5, 1.0, 1.5, 2.0, and 3.0 g Mg $L^{-1}$), as well as with shorter incubation (or resting) time of BPEF with manure (2, 4, 8, 24, 48, 168, and 360 hours). These tests were conducted this time on two (2) types of manure, nursery (FIG. 2A) and grower/finisher (FIG. 2B) liquid manure. The results illustrated in FIGS. 2A and 2B show that a minimal incubation (or resting) period of 24 hours is necessary to observe a satisfactory and stable reduction of the total concentration of P in the manure. As seen in FIGS. 2A and 2B, depending on the conditions and the type of manure used, a resting period of 24 hours following the addition of BPEF allowed for a reduction of between 63% to 75% of the total P concentration, whereas a 7-days period of rest reduced the total P concentration between 77% and 83%. Resting or incubation period shorter than 24 hours are not necessarily more advantageous from a practical point of view or do not reduce sufficiently the total P concentration in the manure to be interesting.

The results illustrated in FIGS. 2A and 2B also show that it is still possible to reduce the amount of BPEF to add to the manure to still benefit from a reduction in total P concentration from the liquid phase. Even the smallest amount of BPEF added (corresponding to 0.5 g Mg $L^{-1}$) was efficient in reducing the total P concentration.

Figure 3:
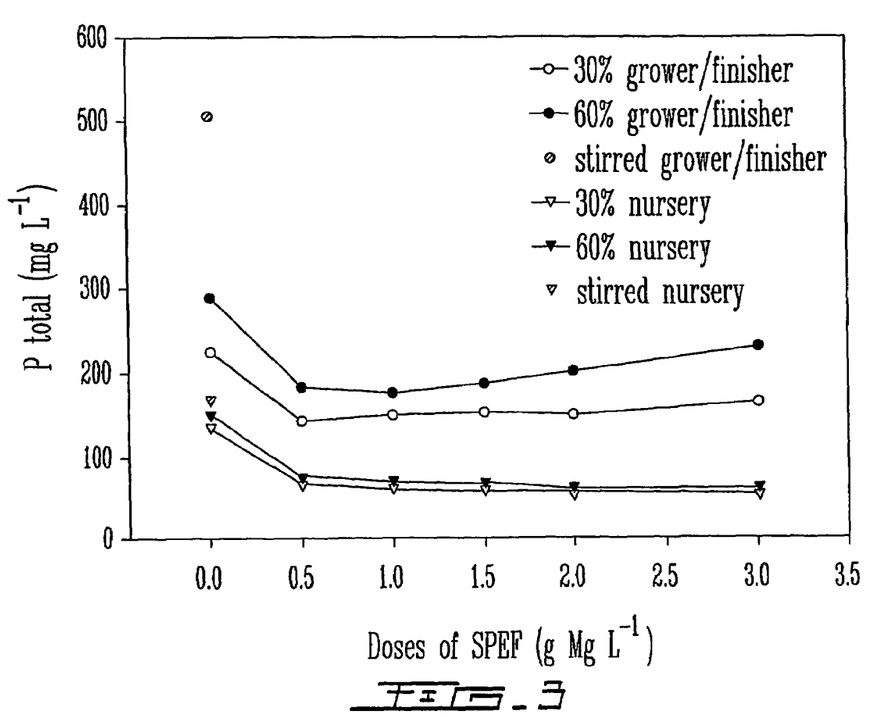
FIG. 3 illustrates the effects of various doses of BPEF and of the depth at which the sample of the liquid fraction of the treated manure is taken, on the total P content of two types of manure, i.e. nursery liquid and grower/finisher liquid manures.

As can be seen in FIG. 3, already at the first dose of BPEF corresponding to 0.5 g Mg $L^{-1}$, there is a reduction in total P measured in the liquid fraction of manure. In FIG. 3, two types of manure were used, i.e. nursery and grower/finisher liquid manure. Both types of manure were either stirred before sampling for measurement or were sampled at 30% or 60% of the depth of the manure pit, i.e. the sample were taken in about the first or second third of the depth of the manure pit.

To experimentally recreate a manure pit, three inflatable pools of a capacity of 2800 liters each were used. A truck used generally for emptying sceptic tanks was filled with pig manure. The truck was filled up only after the manure pit was stirred. The content of the truck (8400 liters) was therefore divided in three equal portions for each of the inflatable pools. One of the pools was used as a manure control, whereas BPEF was added to a second pool and DBP or BPEFh was added to a third pool. Once the by-products were added to two of the three pools, the contents of each pool was stirred. The quantity of magnesium added by these by-products was calculated for an addition of three grams of magnesium per litre of manure. This value was identified under controlled conditions in preliminary tests as being a good value for the test. However, other values were also found acceptable.

One week later, the manure from the pools was fractionated in two fractions, a solid fraction, which deposited at the bottom of the pool, and a liquid fraction on the surface. The liquid fraction of each of the pools was then taken up and applied to experimental field plots for their testing.

Once the liquid fraction of the various pools had been applied to the various experimental field plots, the pools were emptied of their liquid fraction with pumps to gain access to the solid fraction deposited at the bottom of the pools. The solid fractions thus collected from each of the pools were then sprayed over other experimental field plots for further testing.

An experimental site on which forage grass crop was grown was used for testing the various fractions generated in the assays of the present invention. The soil was analysed prior to the treatment. The results are presented in Table 1.

TABLE 1

| Soil analysis at the start of the experiment using the Mehlich 3 extraction method (Kg $ha^{-1}$) | | | | |
|---|---|---|---|---|
| pH ($CaCl_2$ 0.01 M) | P | K | Ca | Mg |
| 5.47 | 332 | 974 | 8290 | 188 |

Tests were conducted on the liquid and solid fractions of the manure for three consecutive years. The addition of the various fractions (liquid and solid) was made every year in one application, which was sprayed when the vegetation started growing in the spring. The same treatment was applied on a given experimental plot every year. The doses of the liquid to be sprayed were calculated following sampling and analysis of the liquid fraction of manure two days prior to the spraying. An effective contribution of 100 kg N $ha^{-1}$ from the liquid fraction of the manure was added. As for the solid portion, it was not possible to make a sampling of this fraction to determine the composition before having it separated from the liquid fraction.

The forage crop was exploited according to a two-cut schedule. Since the phosphorus and potassium were present in sufficient amounts for the growth of the forage crop, no other addition was deemed to be necessary.

A network of four blocks of fifteen experimental field plots of 5 $m^2$ each was set up. A space between each block of 1 m was maintained to allow harvesting. The yield in forage crop was weighed directly in the field with an electronic scale. For each experimental field plot, a sample of approximately 500 g was put in lyophilising bags for further analysis and determination of the dry matter content at 55° C. A sampling of the soil was done after each cutting of the forage crop at various depths (0-20 and 20-40 cm).

Anionic and cationic exchange membranes were used and implanted in experimental field plots. The membranes were inserted in the soil two weeks before each harvesting of the forage crop. The membranes are small strips of material allowing adsorption of negatively or positively charged elements from the soil.

Forage crop samples were ground in a Wiley™ mill equipped with a 1 mm grid. The content in nitrogen, phosphorus, potassium, calcium and magnesium of the forage crop was analysed by humid digestion in a mixture of sulphuric acid-selenic acid-peroxide. Nitrogen and phosphorus were determined by colorimetry on a Lachat™ automated calorimeter. Potassium, calcium and magnesium were tested by atomic absorption. The plant tissues were burned to ashes, solubilized in 2N HCl and their content in Cu, Zn, Fe, Mn, Cd, Co, Cr, Ni, Pb, Al, Ca, and Na was determined by atomic absorption.

Each of the samples taken from the soil in the spring and those that were taken after each cutting were subjected to the same analysis. The soil samples were extracted by the Mehlich 3 method (Mehlich, A. 1984. Mehlich 3 soil extractant: a modification of Mehlich 2 extractant. Communication in soil science and plant analysis. 15(2): 1409-1416). The ammonium and nitrate were extracted from the soil with KCl according to the Maynard and Kalra method (Maynard, D. G. et Y. P. Kalra. 1993. Nitrate and exchangeable ammonium nitrogen: M. R. Carter (ed.) Soil sampling and methods of analysis. Canadian Society of Soil Science. 1993. Lewis Publishers). The nitrate was determined by liquid phase chromatography and by automated colorimetry on a Lachat™ automated colorimeter. The ammonium was determined on the Lachat™ automated colorimeter. The data of the content in nitrate and ammonium were then combined to determine the content in N that is rapidly available in the soil profile. Values of soil bulk density of 1.2 Mgt m$^{-3}$ and 1.3 Mg m$^{-3}$ were assumed for respective layers of 0-20 and 20-40 cm. These values were used to calculate the amount of the different elements per unit of surface area.

Manure was mineralized by humid digestion in a mixture of sulphuric acid, selenic acid and peroxide. The N and P were measured by colorimetry on the Lachat™ automated colorimeter. The potassium, calcium and magnesium content were determined by atomic absorption. The minor elements contained in the manure were determined by calcination and solubilization of the ashes with 2N HCl. The content of the ashes in Cu, Zn, Fe and Mn was determined by atomic absorption. Finally, the soluble elements were extracted with water. The phosphate was measured with the Lachat™ automated colorimeter.

The data were analyzed as a randomized complete block design. The homogeneity of the variance was verified with the Bartlett test. An analysis by contrast was also conducted at the level of significance P<0.05.

Results And Discussion

Manure Analysis

The content in mineral elements in the liquid and solid fractions of treated manure is presented in Tables 2 and 3.

TABLE 2

Analysis of the liquid fraction of manure sprayed (humid base)

| | 1999 | | | 2000 | | | 2001 | | |
|---|---|---|---|---|---|---|---|---|---|
| | DBP | BPEF | Control | BPEFh | BPEF | Control | BPEFh | BPEF | Control |
| % Water | 99.3 | 98.2 | 99.4 | 98.9 | 97.3 | 99.1 | 99.2 | 97.8 | 99.2 |
| C/N | 1.38 | 5.24 | 1.04 | 1.46 | 3.75 | 1.28 | 2.02 | 3.85 | 1.99 |
| N(mg L$^{-1}$) | 940 | 875 | 1324 | 2262 | 2202 | 2242 | 1601 | 1762 | 1578 |
| P(mg L$^{-1}$) | 3.0 | 2.0 | 8.5 | 34 | 23 | 94 | 45 | 47 | 97 |
| K(mg L$^{-1}$) | 845 | 963 | 965 | 1488 | 1510 | 1433 | 1151 | 1202 | 1150 |
| Ca(mg L$^{-1}$) | 188 | 180 | 103 | 333 | 428 | 280 | 236 | 721 | 246 |
| Mg(mg L$^{-1}$) | 77 | 1337 | 19 | 156 | 1626 | 32 | 54 | 1445 | 20 |
| Na(mg L$^{-1}$) | 260 | 850 | 300 | 650 | 1660 | 530 | 500 | 1580 | 600 |
| Cu(mg L$^{-1}$) | 0.82 | 0.46 | 0.81 | 2.84 | 1.95 | 2.68 | 2.68 | 2.62 | 2.18 |
| Zn(mg L$^{-1}$) | 2.74 | 1.27 | 2.97 | 3.45 | 1.97 | 3.82 | 4.89 | 3.96 | 4.77 |
| Mn(mg L$^{-1}$) | 1.07 | 2.08 | 0.71 | 1.19 | 2.46 | 0.58 | 4.45 | 14.28 | 3.70 |
| Fe(mg L$^{-1}$) | 4.90 | 3.99 | 7.08 | 4.37 | 5.13 | 4.94 | 1.11 | 22.69 | 0.70 |
| Cl(mg L$^{-1}$) | n.a. | n.a. | n.a. | 1372 | 9239 | 544 | 1082 | 7194 | 793 |
| P—PO$_4$(mg L$^{-1}$) | n.a. | n.a. | n.a. | 8.32 | 4.02 | 53.70 | 1.52 | 0.26 | 15.64 | n.a.: not available

TABLE 3

Analysis of the solid fraction of manure sprayed (dry base)

| | 1999 | | | 2000 | | | 2001 | | |
|---|---|---|---|---|---|---|---|---|---|
| | DBP | BPEF | Control | BPEFh | BPEF | Control | BPEFh | BPEF | Control |
| % Water | 86.0 | 54.2 | 91.6 | 82.7 | 89.1 | 80.1 | 67.4 | 86.7 | 94.7 |
| C/N | 71.9 | 17.1 | 5.0 | 7.8 | 6.1 | 16.9 | 36.5 | 9.9 | 6.6 |
| N(%) | 3.0 | 0.9 | 3.7 | 2.0 | 4.0 | 6.4 | 0.6 | 2.8 | 7.0 |
| P(%) | 0.2 | 0.06 | 0.3 | 0.6 | 2.4 | 3.1 | 0.3 | 1.9 | 3.5 |
| K(%) | 1.6 | 0.4 | 1.7 | 0.5 | 0.87 | 0.9 | 0.3 | 0.9 | 2.2 |
| Ca(%) | 4.1 | 9.7 | 11.5 | 3.0 | 9.1 | 3.4 | 6.9 | 8.1 | 3.0 |
| Mg(%) | 7.4 | 7.2 | 1.7 | 9.0 | 7.4 | 2.0 | 8.8 | 9.5 | 2.2 |
| Na(%) | 0.7 | 0.9 | 0.4 | 0.95 | 0.98 | 0.5 | 0.9 | 0.5 | 0.1 |
| Cu(ppm) | 1149 | 662 | 358 | 129 | 550 | 731 | 96 | 380 | 731 |
| Zn(ppm) | 383 | 838 | 1928 | 191 | 917 | 1243 | 474 | 1357 | 2179 |
| Mn(ppm) | 597 | 1696 | 700 | 1893 | 3112 | 531 | 2076 | 2531 | 1130 |
| Fe(ppm) | 4105 | 2068 | 4830 | 888 | 2567 | 1719 | 5562 | 4685 | 674 |
| Cl(ppm) | n.a. | n.a. | n.d. | 5093 | 30818 | 544 | 18469 | 66932 | 14880 |
| P—PO$_4$(ppm) | n.a. | n.a. | n.a. | 6.6 | 7.9 | 1083 | 0.8 | 0.4 | 84.1 | n.a.: not available

The three by-products evaluated in accordance with the present invention reduced the content in total P and P—PO$_4$ of the liquid fraction of manure. For example, the total P content found in the manure that was treated with BPEF represents only 23 to 48% of the total P found in the control manure. The PO$_4$ content found in the manure treated represented only 1.9 to 7.5% of the PO$_4$ content of the control manure. For the solid fraction, the contents in N, P and K were also reduced. The addition of BPEF in the manure increased the content in Mg, Na and Cl of both fractions of manure. The BPEF reduced the content in Zn and increased the content in Mn of the liquid fraction.

A further experiment identical to the one reported above was further reproduced in commercial size manure pit (instead of a pool), with a dose of BPEF corresponding to 2 g Mg L$^{-1}$. The results of this experiment showing the content in nutrients in the manure are being reproduced below in Table 4. The increase in the Mg content of the manure is lower in this experiment. Furthermore, the total N (nitrogen) concentration of the solid phase increase following the treatment of manure with BPEF in a commercial size manure pit. The reduction of the total P concentration of the liquid phase of the manure pit is greater in this experiment, when compared with the experiment in the pool. This decrease of the total P concentration of the liquid phase is accompanied by an increase of the total P concentration of the solid phase. Finally, the water content of the solid phase is reduced with respect to raw manure, indicating a sedimentation of the solid particles at the bottom of the manure pit, following the addition of BPEF.

TABLE 4

Chemical analysis of treated manure

| | Manure supplemented with BPEF | | |
|---|---|---|---|
| | Liquid phase | Solid phase | Control manure |
| Total N (g L$^{-1}$) | 2.0 ± n.a. | 4.7 ± 0.3 | 2.6 ± n.a. |
| Total P (g L$^{-1}$) | 0.1 ± n.a. | 4.7 ± 0.7 | 0.8 ± n.a. |
| Total Mg (g L$^{-1}$) | 1.0 ± n.a. | 4.5 ± 0.2 | 0.3 ± n.a. |
| Water (%) | 97 ± n.a. | 91 ± n.a. | 98 ± n.a. | n.a.: standard deviation smaller than 0.1

Soils

The liquid and the solid fractions of the BPEF treated manure had no effect on soil P concentration.

The addition of the treated manure to the soil has mainly influenced the content in mineral N from the soil profile. The effect of the treatment has however not been the same each year. More particularly, in 1999, the spraying of the liquid fraction of manure treated with BPEF did not cause any difference in the mineral N content of the soil with respect to the control manure (see Table 5).

TABLE 5

Effect of the addition of 200 Kg N ha$^{-1}$ in the form of the liquid fraction of pig manure on the mineral N content (Kg N ha$^{-1}$) of the soil profile (means of sampling of soils conducted at each cutting of the forage crop)

| | 1999 | 2000 | 2001 |
|---|---|---|---|
| BPEFh | 48 a | 72 b | 77 b |
| BPEF | 42 a | 135 a | 139 a |
| Control | 36 a | 54 b | 82 b |

Throughout the present application, when values are identified with the same letter in the same column, these represent values that are not significatively different (P>0.05). Values identified with different letters are significatively different (P<0.05).

However, in 2000 and 2001, the mineral N content of the soil was significantly increased with the liquid fraction of manure treated with BPEF. The addition of the solid fraction of manure treated with BPEF shows an increase in mineral N of the soil only in 2001 (Table 6).

TABLE 6

Effect of the addition of 200 Kg N ha$^{-1}$ in the form of the solid fraction of pig manure on the mineral N content (Kg N ha$^{-1}$) of the soil profile (means of sampling of soils conducted at each cutting of the forage crop)

| | 1999 | 2000 | 2001 |
|---|---|---|---|
| BPEFh | 31 a | 91 a | 81 b |
| BPEF | 47 a | 95 a | 145 a |
| Control | 61 a | 68 a | 61 b |

The results obtained with the liquid fraction of manure treated with BPEF suggest that the N is more readily available than that found with any other treatment, and this, in two out of three years.

Figure 4:
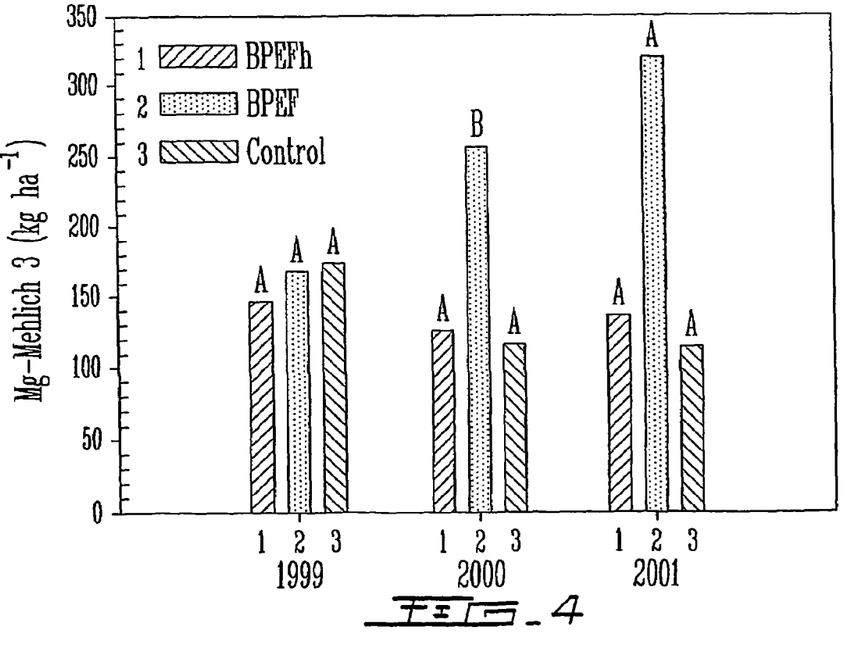
FIG. 4 illustrates the effect of the liquid fraction of manure treated with magnesium-containing by-products in accordance with the present invention on the magnesium content in the Mehlich 3 extracted soil profile.

The contribution of the liquid fraction treated with BPEF significantly increased the content in soluble Mg in Mehlich 3 in 2000 (FIG. 4). Despite the absence of a significant effect in 2001, the contribution of the liquid fraction of manure treated with BPEF seems to largely increase the content of soluble Mg in Mehlich 3.

In 2000 and 2001, the solid fraction of the treated manure with BPEF and BPEFh increased the soluble Mg content in Mehlich 3 in the soil profile when compared to the control. In 1999, no significant effect was observed.

Figure 5:
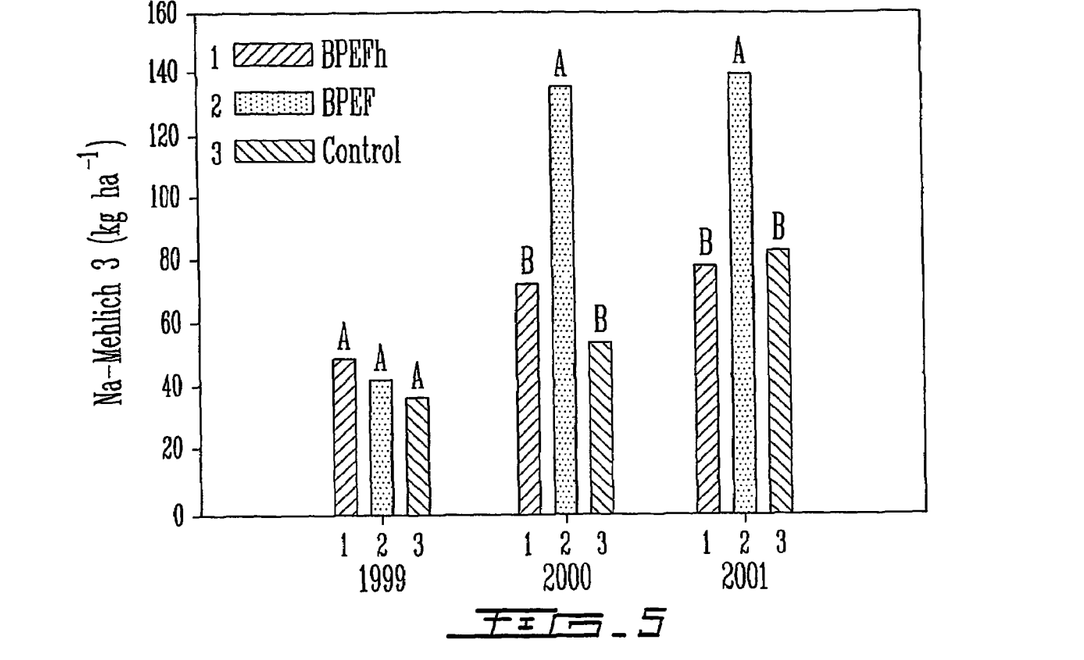
FIG. 5 illustrates the effect of the liquid fraction of manure treated with magnesium-containing by-products in accordance with the present invention on the sodium content in the Mehlich 3 extracted soil profile.
Figure 6:
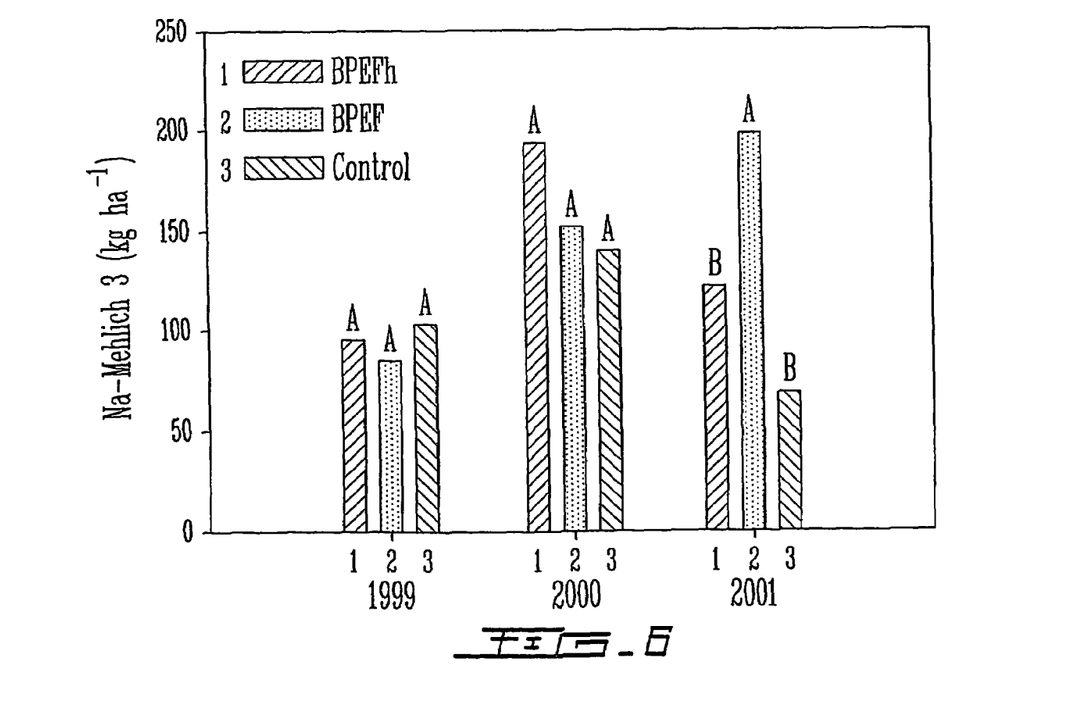
FIG. 6 illustrates the effect of the solid fraction of manure treated with magnesium-containing by-products in accordance with the present invention on the sodium content in the Mehlich 3 extracted soil profile.

The effect of the contribution of each fraction of manure on the Na content of the soil is presented in FIGS. 5 and 6. The liquid fraction of manure treated with BPEF significantly increased the Na content of the soil in 2000 and 2001. The addition of the solid fraction of manure treated with BPEF influenced the Na content of the soil only in 2001.

Crop Uptake

Figure 7:
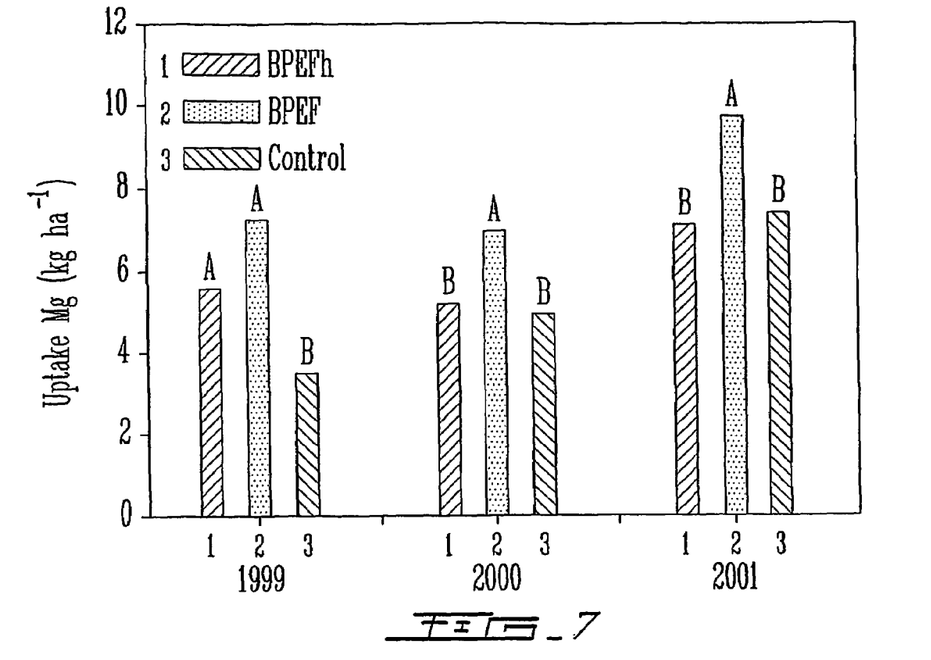
FIG. 7 illustrates the effect of the liquid fraction of manure treated with magnesium-containing by-products in accordance with the present invention on the magnesium uptake of the forage crop.

The addition of the liquid fraction of manure treated with BPEF increased the Mg uptake by the crop over the three years (FIG. 7). The addition of BPEF in the manure increased the Mg content of the liquid fraction of manure. This Mg would therefore be bio-available to a crop. The use of the liquid fraction of manure treated with BPEF could therefore allow the reduction of potential problems caused by grass tetany or other metabolic problems that some farmers are facing with the mineral composition of forage crops.

Grass Tetany

Figure 8:
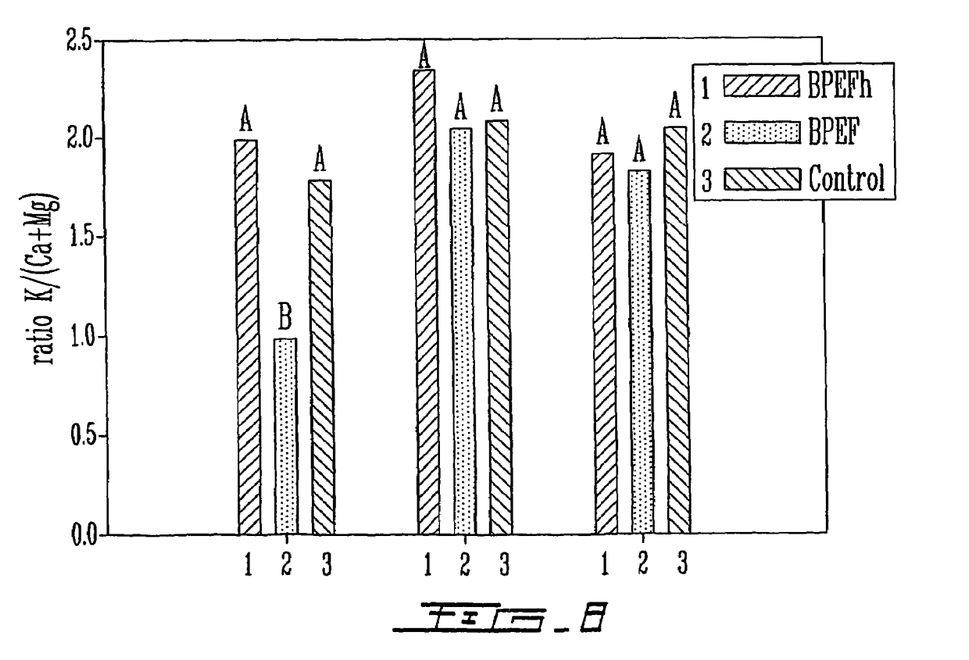
FIG. 8 illustrates the effect of the liquid fraction of manure treated with magnesium-containing by-products in accordance with the present invention on the K/(Ca+Mg) ratio found in the forage crop.
Figure 9:
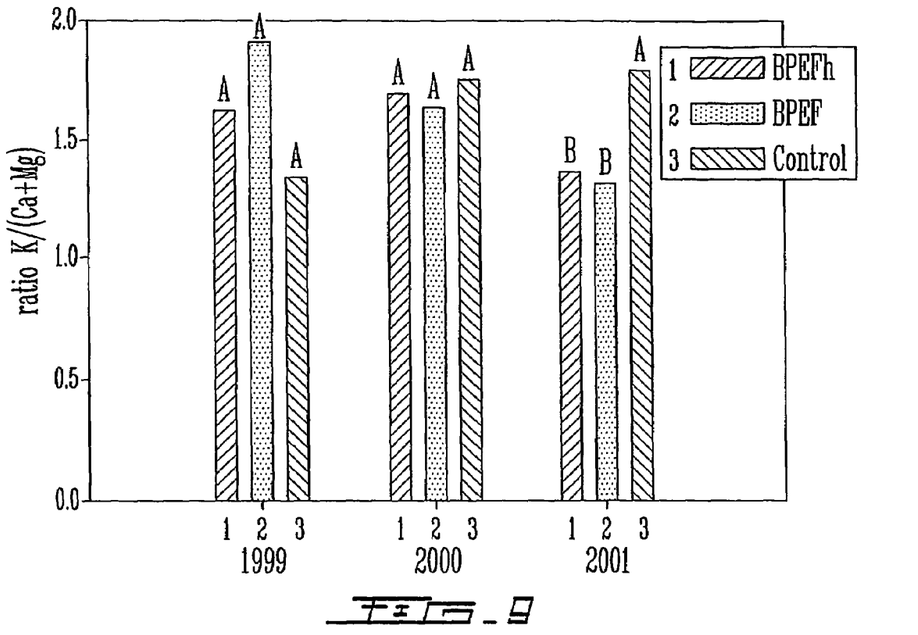
FIG. 9 illustrates the effect of the solid fraction of manure treated with magnesium-containing by-products in accordance with the present invention on the K/(Ca+Mg) ratio found in the forage crop.

The addition of treated manure also influenced the likelihood of forage crop to cause tetany. The addition of the liquid fraction of manure treated with BPEF in 1999 significantly diminished the ratio K/(Ca+Mg)(FIG. 8) and thus the likelihood of the forage crop to cause grass tetany. Another marked effect in 2001 was a diminution of the ratio with respect to the solid fraction treated with BPEF (FIG. 9). The addition of manure treated with BPEF increased the Mg uptake by the crop, therefore reducing the ratio K/(Ca+Mg).

Anionic and Cationic Exchange Resins

Figure 10:
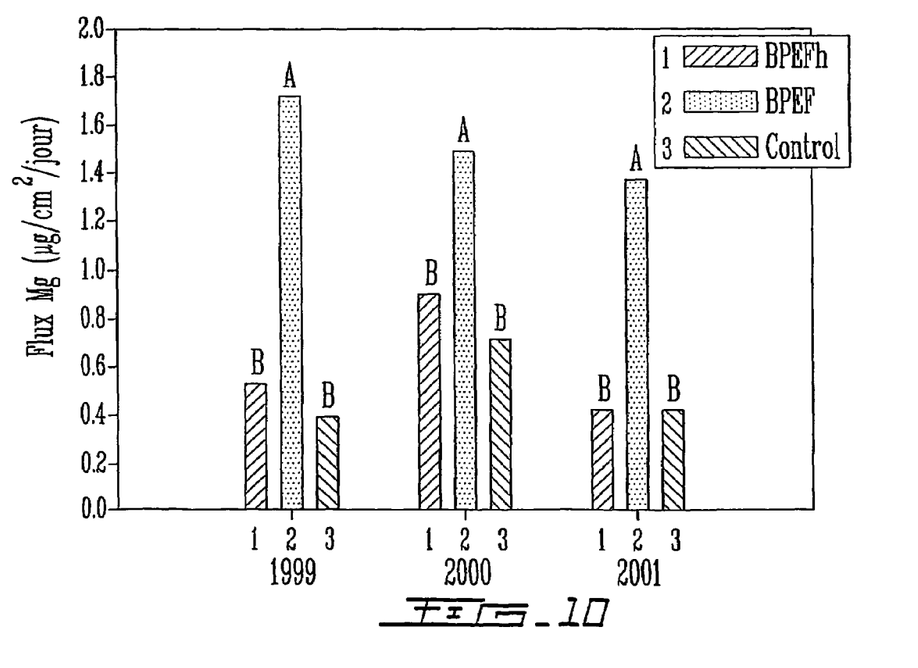
FIG. 10 illustrates the effect of the liquid fraction of manure treated with magnesium-containing by-products in accordance with the present invention on the magnesium flux in the soil.
Figure 11:
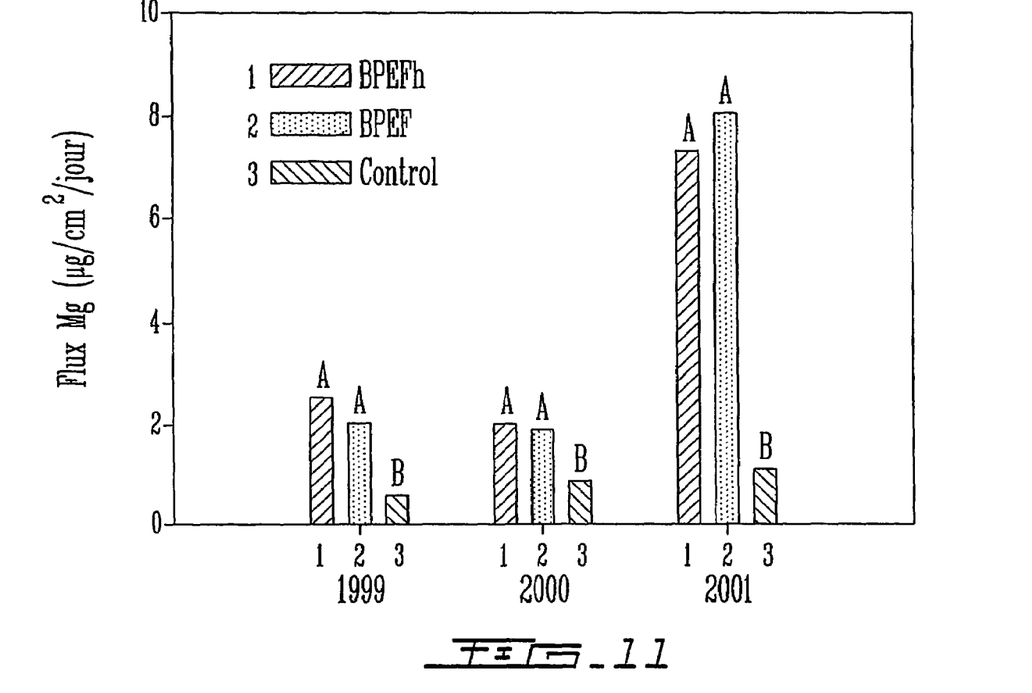
FIG. 11 illustrates the effect of the solid fraction of manure treated with magnesium-containing by-products in accordance with the present invention on the magnesium flux in the soil.

The addition of manure treated with magnesium-containing by-products influenced the Mg flux in the soil. For both the liquid and solid fractions of manure treated with BPEF, their application on the soil resulted in an increase in the Mg flux over the three years (see FIGS. 10 and 11). The difference was even more important in 2001 between the solid fraction of the manure treated with BPEF and the control.

CONCLUSIONS

The addition of BPEF to manure has advantageously reduced the total P and P—$PO_4$ content of the liquid fraction of manure, which is currently causing problems to some farmers. The total P content found in the liquid fraction of manure treated with BPEF represented 13 to 48% of that found in the control manure. The P—$PO_4$ content of the liquid fraction treated with BPEF represented only 1.9 to 7.5% of that found in the control manure. The present invention has a further advantage of increasing the Mg content in pig manure.

The addition of the liquid fraction treated with BPEF also increased the mineral N content found in the soil, and this, in two out of three years. For 1999, an increase in the uptake of N by the forage crop was observed.

The addition of BPEF in a manure pit therefore represents an interesting solution to some farmers' problem. Furthermore, the addition of BPEF also represents an advantageous solution for the disposal of residues from the magnesium industry.

The liquid fraction of manure resulting from the present invention has reduced content in total P and P—$PO_4$, which therefore allows the spraying of the liquid fraction on soils rich in phosphorus, in accordance with environmental regulations.

Throughout the present application, experiments were conducted over three different years (in 1999, 2000, and 2001). The difference in weather could explain some variations between each year. The amount of rain received from year to year was not the same, therefore affecting the content of the various elements measured in the soil or in the plants. However, the method of the present invention has been proven beneficial for both the magnesium industry and the pig production industry for allowing the spraying of the liquid fraction of the manure on fields with high soil P contents while respecting the environmental regulations.

The use of the process of the present invention therefore allows exporting outside the farm the solid fraction that could be used as an organic fertilizer enriched in P for its use in regions with soils low in P.

The use of the method of the present invention also allows reducing the content of phosphate in liquid manure. The phosphate so precipitated in the solid fraction of manure could then be exported outside the farm at lower costs. No supplemental infrastructure will be required and no special equipment other than that already generally found on a pig farm to spray the manure on the field will be required. The method of the present invention is therefore much cheaper than any other method already known in the prior art such as the mechanical separator, the filtering membrane or other chemical methods or composting and more importantly solves problematic situations in two distinct industries.

The invention claimed is:

1. A process of de-phosphatation of manure, said process comprising the steps of,
   a) adding by-products of electrolysis and foundry (BPEF) containing Mg to liquid manure;
   b) stirring the manure-containing BPEF;
   c) letting the manure-containing BPEF that was so stirred stand for a time sufficient for the manure to separate into a solid fraction and a liquid fraction, said solid fraction depositing in a manure pit; and
   d) separating the liquid and solid fractions,
wherein said liquid fraction contains less than 50% of total phosphorus initially contained in the manure, said phosphorus being found in the solid fraction.

2. The method of claim 1, wherein the BPEF is gradually added to the manure and said stirring is being made throughout the addition of BPEF.

3. The method of claim 1, wherein the step of stirring is maintained for a period of time after the addition of BPEF to ensure proper mixing.

4. The method of claim 1, wherein said manure is left to settle for a period of at least one day after the stirring is finished for allowing deposition of the solid fraction containing phosphorus and solid particles.

5. The method of claim 1, wherein said manure is left to settle for a period of at least seven (7) days after the stirring is finished for allowing deposition of the solid fraction containing phosphorus and solid particles.

6. The method of claim 1, wherein said BPEF is added in an amount corresponding to at least 0.5 g Mg $L^{-1}$ of manure.

7. The method of claim 1, wherein said BPEF is added in an amount corresponding to about 0.5 to 5.0 g Mg $L^{-1}$ of manure.

8. The method of claim 1, wherein said BPEF is added in an amount corresponding to about 3 g Mg $L^{-1}$ of manure.

* * * * *